A. R. Reese.
Harvester Rake.
No. 21,847        Patented Oct. 19. 1858.
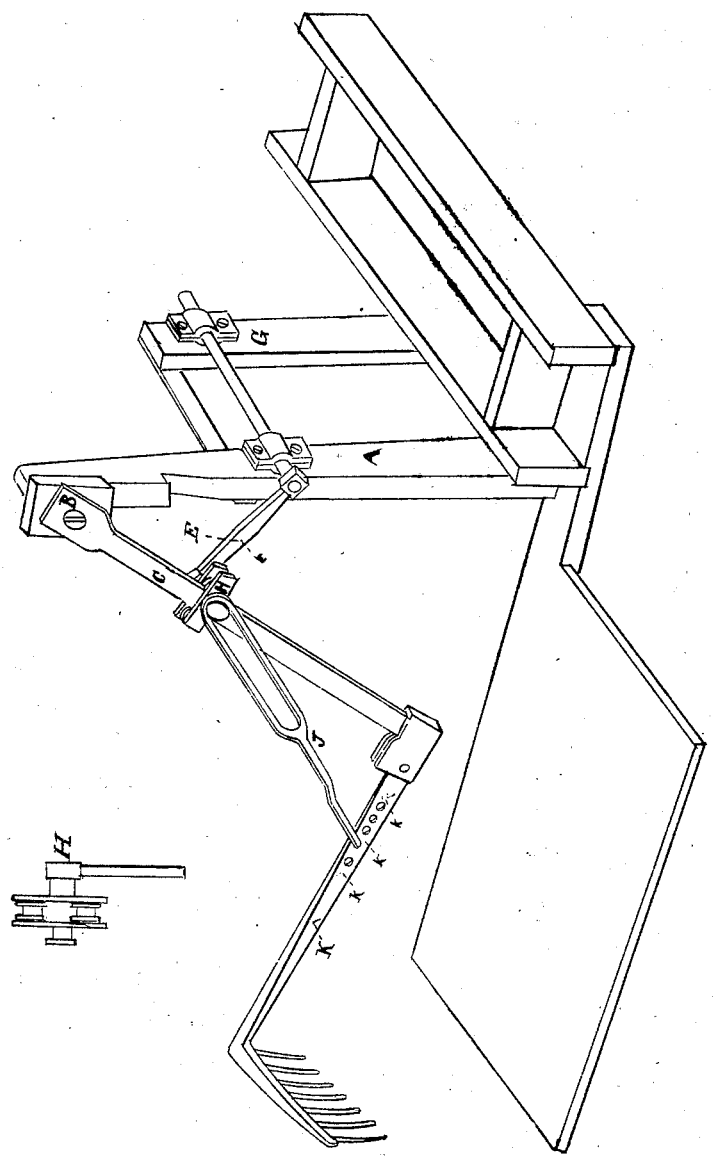
Witnesses
John L. Back
Herbert Thomas
Adam R. Reese

UNITED STATES PATENT OFFICE.

ADAM R. REESE, OF PHILLIPSBURG, NEW JERSEY.

IMPROVED RAKING ATTACHMENT TO HARVESTERS.

Specification forming part of Letters Patent No. 21,847, dated October 19, 1858.

*To all whom it may concern:*

Be it known that I, ADAM R. REESE, of Phillipsburg, in the State of New Jersey, have invented a new and useful Improvement in Reaping-Machines; and I do hereby declare the following to be a full and exact description of the same, reference being had to the annexed drawing, making a part of this specification, which represents a perspective view of my improvement.

My improvement consists in an arrangement, substantially as hereinafter described, of the parts of a self-raking attachment to reaping-machines for delivering the cut grain onto the ground in gavels ready for binding.

A is an upright post, attached to the frame of the gearing. This post is about six feet high, and is securely braced at the bottom. At its upper extremity there is secured, by a screw, B, as a pivot, a vibrating arm, C, made of iron, which arm is about five feet long.

F is a small shaft, supported on journals attached to the post A and the post G. At one extremity of the shaft F is attached a crank, E, which is geared so as to work the vibrating arm C by means of an oscillating box, H, which works loosely on the crank-pin, so as to slide up and down the vibrating arm, and causes it to vibrate as the shaft F revolves. The rake K is composed of an arm or handle, made of iron, about five feet long, and is hinged or pivoted to the lower end of the arm C. This rake has a series of holes, *k k k*, in the handle.

J is an arm or link-rod, having at its upper extremity a slot, which works loosely in a pin attached to the side of the oscillating box H. There is a hook or pivoted end at the other extremity of the rod J, which works in one of the holes *k k k*.

The operation of these parts is as follows: The revolution of the shaft F causes the crank E to elevate the toothed end of the rake K by means of the slotted link-bar J, attached to the oscillating box. The arm C then moves the rake, while so elevated, across the platform, over and above the grain. As the teeth of the rake come vertically over the far side, the slotted link J permits the rake to drop onto the grain, where it rests, while the arm C draws the rake across the platform, carrying with it the grain. While the rake is thus being drawn across the platform the pin on the oscillating box moves loosely and freely along the slot in the link-piece J, without raising it, until the rake is carried by the arm C entirely across the platform. Then the pin on the oscillating box elevates the upper end of the slotted link-piece J, raising and sustaining the rake above the grain, while it passes across the platform, as first described, and the operation is repeated, as described.

Having thus described my improvement, what I claim as my invention, and desire to secure by Letters Patent, is—

The combination of the vibrating arm C, the rake K, the link-piece J, and the crank E, when the several parts are constructed, arranged, and operated substantially as above described.

ADAM R. REESE.

Witnesses:
JOHN S. BACH,
HERBERT THOMAS.